(12) United States Patent
Blank et al.

(10) Patent No.: US 11,993,322 B2
(45) Date of Patent: May 28, 2024

(54) ELECTROMECHANICAL MOTOR VEHICLE STEERING SYSTEM COMPRISING HOUSING PARTS THAT ARE INTERCONNECTED BY MEANS OF TAPERED INTERFERENCE FIT

(71) Applicants: thyssenkrupp Presta AG, Eschen (LI); thyssenkrupp AG, Essen (DE)

(72) Inventors: Katrin Blank, Satteins (AT); Dominik Schweitzer, Eschen (LI)

(73) Assignees: thyssenkrupp Presta AG, Eschen (LI); thyssenkrupp AG, Essen (DE)

(*) Notice: Subject to any disclaimer, the term of this patent is extended or adjusted under 35 U.S.C. 154(b) by 749 days.

(21) Appl. No.: 15/733,930

(22) PCT Filed: Jun. 4, 2019

(86) PCT No.: PCT/EP2019/064471
§ 371 (c)(1),
(2) Date: Dec. 1, 2020

(87) PCT Pub. No.: WO2019/234013
PCT Pub. Date: Dec. 12, 2019

(65) Prior Publication Data
US 2021/0129900 A1    May 6, 2021

(30) Foreign Application Priority Data
Jun. 5, 2018    (DE) ..................... 10 2018 113 302.2

(51) Int. Cl.
*B62D 5/04* (2006.01)
*H02K 5/04* (2006.01)
*H02K 15/14* (2006.01)

(52) U.S. Cl.
CPC ............ *B62D 5/0403* (2013.01); *H02K 5/04* (2013.01); *H02K 15/14* (2013.01)

(58) Field of Classification Search
CPC ......... B62D 5/0403; H02K 5/04; H02K 15/14
See application file for complete search history.

(56) References Cited

U.S. PATENT DOCUMENTS

| 4,017,964 A | 4/1977 | Schulte et al. |
| 6,268,669 B1 | 7/2001 | Wakao |

(Continued)

FOREIGN PATENT DOCUMENTS

| CN | 103402854 A | 11/2013 | |
| CN | 104854970 A * | 8/2015 | ............. H05K 5/006 |

(Continued)

OTHER PUBLICATIONS

English Translation of International Search Report issued in PCT/EP2019/064471, dated Jul. 18, 2019.

(Continued)

*Primary Examiner* — Jacob D Knutson
(74) *Attorney, Agent, or Firm* — hyssenkrupp North America, LLC

(57) ABSTRACT

An electromechanical motor vehicle steering system includes an electric motor and an electronic control unit. The electromechanical motor vehicle steering system is at least partially surrounded by housing parts. At least two of the housing parts are connected to one another by interference fit, wherein the interference fit is at least partly a tapered interference fit.

11 Claims, 3 Drawing Sheets

(56) References Cited

U.S. PATENT DOCUMENTS

| | | | |
|---|---|---|---|
| 7,837,002 B2 * | 11/2010 | Kanda | B62D 5/0406 |
| | | | 180/444 |
| 2013/0017517 A1 | 1/2013 | Scianna | |
| 2013/0187517 A1 | 7/2013 | Asao et al. | |
| 2013/0338879 A1 | 12/2013 | Szabolcs et al. | |
| 2016/0036288 A1 | 2/2016 | Yamasaki | |
| 2016/0036299 A1 | 2/2016 | Hayashi | |
| 2016/0065027 A1 | 3/2016 | Taniguchi | |
| 2016/0094104 A1 | 3/2016 | Yamasaki | |
| 2017/0050667 A1 | 2/2017 | Strobel et al. | |
| 2017/0217476 A1 | 8/2017 | Schlegel et al. | |
| 2017/0302121 A1 | 10/2017 | Guttenberger | |

FOREIGN PATENT DOCUMENTS

| | | | | |
|---|---|---|---|---|
| CN | 104854970 A | 8/2015 | | |
| CN | 106458250 A | 2/2017 | | |
| DE | 197 82 297 B | 2/2005 | | |
| EP | 1 919 037 A | 5/2008 | | |
| EP | 1919037 A2 * | 5/2008 | | H01R 13/5045 |
| IN | 106536327 A | 3/2017 | | |
| WO | WO-2011003526 A2 * | 1/2011 | | F16B 21/183 |

OTHER PUBLICATIONS

Wittel, H.; Jannasch, D.; Voβiek, J; Spura, C., Roloff/Matek Maschinenelemente, pp. 435-445, Springer Vieweg (1963).

* cited by examiner

ELECTROMECHANICAL MOTOR VEHICLE STEERING SYSTEM COMPRISING HOUSING PARTS THAT ARE INTERCONNECTED BY MEANS OF TAPERED INTERFERENCE FIT

CROSS REFERENCE TO RELATED APPLICATIONS

This application is a U.S. National Stage Entry of International Patent Application Serial Number PCT/EP2019/064471, filed Jun. 4, 2019, which claims priority to German Patent Application No. DE 10 2018 113 302.2, filed Jun. 5, 2018, the entire contents of both of which are incorporated herein by reference.

FIELD

The present disclosure generally relates to an electromechanical motor vehicle steering system.

BACKGROUND

Electromechanical motor vehicle power steering systems have servo units which may be arranged as a power assistance device on a pinion or a rack of the steering gear. In this case the servo unit has, in addition to an electric motor, an electronic control unit (ECU) for calculating the steering assistance. The housing parts of the components must have a sufficiently stable connection which ideally permits a closed ECU. Additionally it is desirable that the power pack, comprising the motor and the ECU, is cylindrical so that it is able to be used in a manner which is as variable as possible.

From the prior art, for example in the published patent application US 2016 065 027 A1, it is known to connect a multipart electric motor housing, which is connected to an ECU housing, mechanically via a plurality of bolts. This solution proves to be a drawback since contaminants and water may penetrate via unsealed regions and may damage the components. Moreover, significant constructional space is required for such a connection.

From the prior art it is additionally known to introduce the ECU housing into the electric motor housing by means of a cylindrical press connection. When joining the motor housing and the ECU housing very high process forces are present, preventing other joining processes (for example of plug contacts for the electrical connection) from being able to be reliably carried out and monitored at the same time. Additionally, the length of the press connection has to be selected to be sufficiently great that the desired stability of the connection may be achieved.

Thus, a need exists for a method for producing an improved mechanical connection between the housing parts of an electromechanical motor vehicle power steering system which permits a stable, compact and sealed connection which is simple in terms of its production and which is able to be monitored in a simple manner.

DETAILED DESCRIPTION

Figure 1:
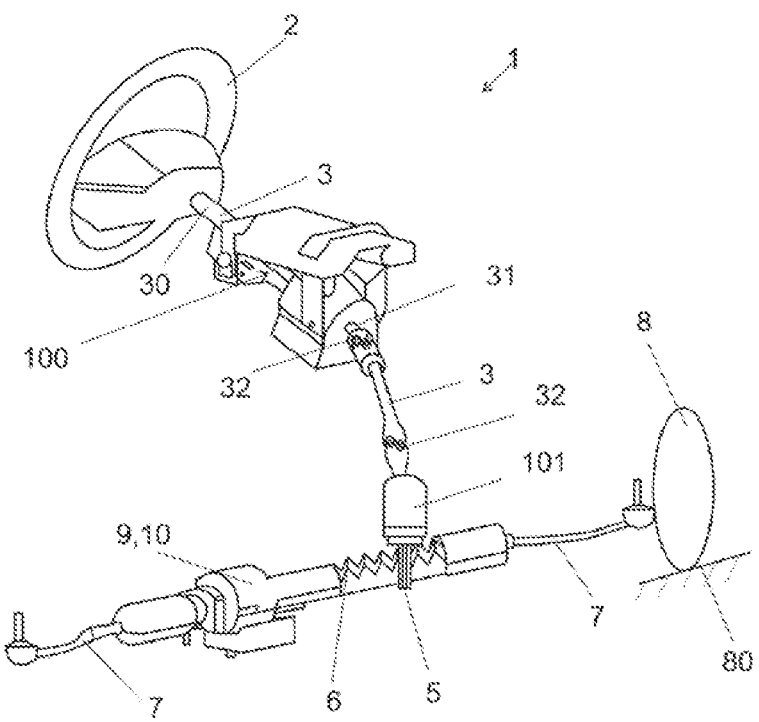
FIG. 1 is a perspective view of an electromechanical power steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to an electromechanical motor vehicle steering system and a method for connecting housing parts of an electromechanical motor vehicle steering system.

Accordingly an electromechanical motor vehicle steering system comprising an electric motor and an electronic control unit is provided, wherein the electromechanical motor vehicle steering system is at least partially surrounded by housing parts and at least two of the housing parts are connected to one another by interference fit, wherein the interference fit is at least partly a tapered interference fit. The interference fit is preferably a longitudinal interference fit.

The tapered interference fit permits a stable, compact and sealed connection of the two housing parts. The process forces which are present are significantly lower than in the case of a purely cylindrical press connection. This has the advantage that other joining processes may be carried out and monitored more reliably. Additionally, insensitive parts of the ECU may be placed in the space produced by the press connection, whereby a compact design of the power pack may be achieved.

Preferably, the tapered interference fit is formed by means of two corresponding tapered joining surfaces which adopt a setting angle of greater than 0°, which preferably ranges from 0.5°-5°, in particular ranges from 1°-3°. The setting angle of the two joining surfaces preferably coincides. It is advantageous if the interference fit has an oversize. The oversize is dependent on the joining distance and the setting angle.

In a preferred embodiment, the interference fit is exclusively a tapered interference fit having a joining distance comprising a joining distance without force and a push-on distance, wherein the joining distance without force is greater than the push-on distance. The joining distance describes the entire axial penetration depth of the one housing part into the respective other housing part. This has the advantage that the joining force only increases at the end of the joining distance. Other joining processes may be carried out, in particular, in a controlled manner over the joining distance without force. The oversize may be preferably set by means of the push-on distance, wherein the push-on distance describes the last or final part of the axial joining distance which the second housing part located loosely on the first housing part has to cover in order to reach the position of the interference fit.

The axial relative displacement (pushing-on) of the housing parts to be joined leads to transverse strains and thus to the creation of a corresponding joining pressure in the active surfaces. Due to the oversize, therefore, one of the housing parts is widened in the region of an opening. As a result, a surface pressure is produced in the friction surfaces.

The length of the joining distance without force depends on the choice of setting angle. The greater the angle, the greater the joining distance without force. However, with an increasing setting angle the joining force also rises, whilst the releasing force drops. An optimal compromise is desired with a releasing force which is as high as possible, a joining force which is as low as possible and a joining distance without force which is as great as possible.

Preferably the joining distance without force takes up more than 60% of the entire joining distance, further preferably more than 70% of the entire joining distance. Preferably the push-on distance takes up more than 8% and less than 30% of the entire joining distance.

It is advantageous if an internal part of the housing parts connected by means of the interference fit has a peripheral shoulder which delimits the joining distance.

In a further advantageous embodiment, in the longitudinal direction or axial direction the interference fit is a combination of a cylindrical press connection and a tapered interference fit. The joining surfaces to be joined together may be produced in a simpler manner. Additionally, in this case an annular groove with an inserted O-ring may be provided in the region of the cylindrical press connection for sealing between the housing parts. Preferably, the cylindrical region is between 5% to 15%, wherein the remaining region is of tapered configuration.

Moreover, a method for connecting housing parts of an electromechanical motor vehicle steering system is provided, comprising an electric motor and an electronic control unit, wherein the method comprises the following steps:

providing two housing parts as an internal part and an external part, wherein the external part has an opening with an at least partially tapered internal surface which tapers when it passes into the opening, and wherein the internal part has a corresponding taper with a tapered seat surface, positioning the external part on the internal part and pressing the external part onto the internal part with a defined axial joining force.

Preferably the tapered interference fit is formed by means of two corresponding tapered joining surfaces which form a setting angle which is greater than 0°, which preferably ranges from 0.5°-5°, in particular ranges from 1°-3°. It is advantageous if the interference fit has an oversize.

In a preferred embodiment of the method, the interference fit is exclusively a tapered interference fit having a joining distance comprising a joining distance without force and a push-on distance, wherein the joining distance without force is greater than the push-on distance. Preferably the joining distance without force takes up more than 60% of the entire joining distance, further preferably more than 70% and particularly preferably 90% of the entire joining distance. Preferably the push-on distance takes up more than 8% and less than 30% of the entire joining distance.

It is advantageous if the internal part of the housing parts has a peripheral shoulder which delimits the joining distance.

In a further embodiment, the interference fit in the longitudinal direction is a combination of a cylindrical press connection and a tapered interference fit.

In this case, an annular groove with an inserted O-ring may be provided in the region of the cylindrical press connection for sealing between the joining partners.

Preferably generally the housing parts connected by means of the interference fits described above are a motor housing surrounding the electric motor and a housing part surrounding the electronic control unit. However, for example, the parts of a multipart steering gear housing, a worm housing and the motor housing or a sensor housing and a pinion housing may also be connected by the interference fits.

An electromechanical motor vehicle power steering system 1 with a steering wheel 2, which is coupled fixedly in terms of rotation to a steering shaft 3, is shown schematically in FIG. 1. The driver introduces a corresponding torque via the steering wheel 2 as a steering command into the steering shaft 3. The torque is then transmitted via the steering shaft 3 to a steering pinion 5. The pinion 5 meshes in the known manner with a toothed segment of a rack 6. The steering pinion 5 forms together with the rack 6 a steering gear 40.

The steering shaft 3 has on the input side an input shaft 30 connected to the steering wheel 2 and on the output side an output shaft 31 connected to the rack 6 via the steering pinion 5. The input shaft 30 and the output shaft 31 are connected together in a torsionally flexible manner via a torsion bar, not shown in FIG. 1. A torque introduced by the driver via the steering wheel 2 into the input shaft 30 leads to a relative rotation of the input shaft 30 with respect to the output shaft 31. This relative rotation between the input shaft 30 and the output shaft 31 may be determined by a rotary angle sensor.

The steering shaft 3 according to FIG. 1 further comprises one or more universal joints 32, the path of the steering shaft 3 in the motor vehicle being able to be adapted thereby to the spatial conditions. The intermediate steering shaft of the steering shaft 3, which in the example shown is arranged between two universal joints 32 and which connects the output shaft 31 to the steering pinion 5 of the steering gear 40, is configured as a steering shaft 3 which may be altered in terms of length.

The rack 6 is displaceably mounted in a steering housing 60 in the direction of its longitudinal axis. At its free end the rack 6 is connected to track rods 7 via ball joints, not shown. The track rods 7 in turn are connected in the known manner via steering knuckles to one respective steered wheel 8 of the motor vehicle. A rotation of the steering wheel 2 leads, via the connection of the steering shaft 3 and the pinion 5, to a longitudinal displacement of the rack 6 and thus to a pivoting of the steered wheels 8. Via a road 80 the steered wheels 8 are subjected to a reaction which counteracts the steering movement. As a result, a force which requires a corresponding torque on the steering wheel 2 is needed for pivoting the wheels 8. A servo unit 10 consisting of an electric motor 9 and an electronic control unit 13 is provided in order to assist the driver with this steering movement. The servo unit 10 in this case may be coupled either to a steering shaft 3, the steering pinion 5 or the rack 6. The respective power assistance system introduces an assistance torque into the steering shaft 3, the steering pinion 5 and/or into the rack 6, whereby the driver is assisted with the steering operation. The three different power assistance systems 10, 100, 101 shown in FIG. 1 show alternative positions for the arrangement thereof. Generally only one of the positions shown is provided with a power assistance system. In this case the servo unit may be arranged as superimposed steering on the steering column or as a power assistance device on the pinion 5 or the rack 6.

Figure 2:
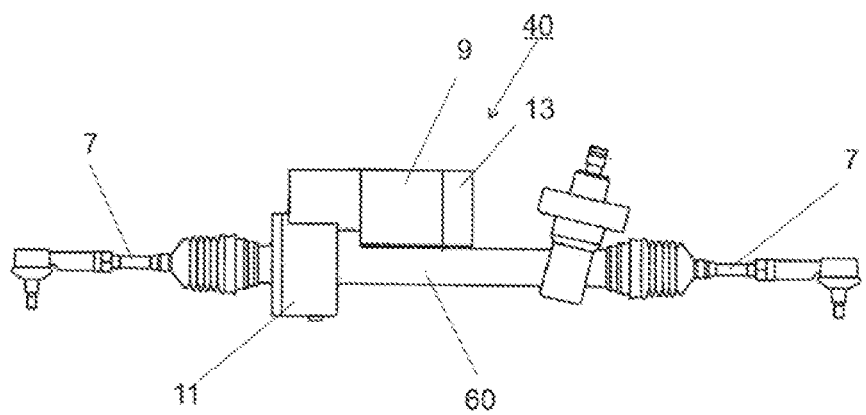
FIG. 2 is a schematic view of the arrangement of the electric motor of the electromechanical power steering system on the rack.

In FIG. 2 an electromechanical motor vehicle steering system 1 is shown with an electric motor 9 which acts on a ball nut of a ball screw drive 11. In FIG. 2 only the housing of the ball screw drive and the steering drive 40 is shown. The ball nut is in engagement via circulating balls with a ball screw which is arranged on the outer periphery of the rack 6. A rotation of the ball nut effects an axial displacement of the rack 6, whereby a steering movement of the driver is assisted. Preferably, the ball screw drive 11 is coupled to the electric motor 9 via a toothed belt.

Figure 3:
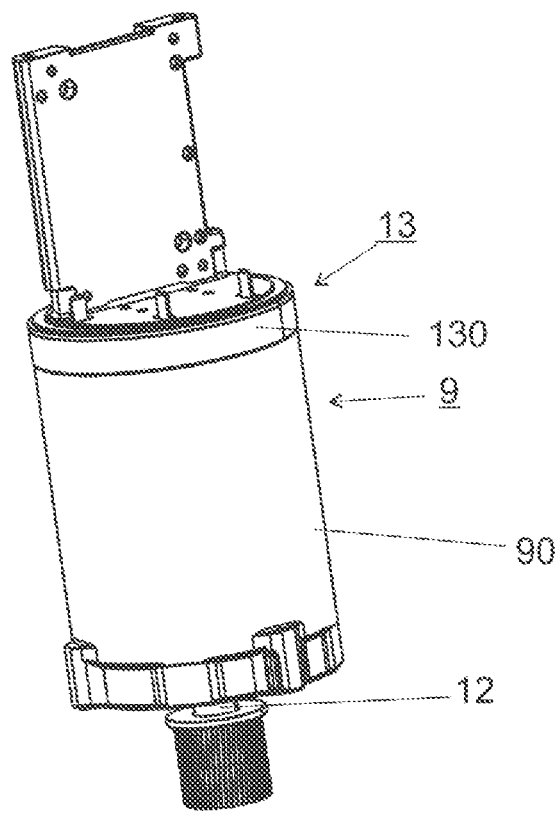
FIG. 3 is a perspective view of a housing of the electric motor with the electronic control unit.

FIG. 3 shows the electric motor 9 with the motor shaft 12 and an electronic control unit (ECU) 13 connected to the electric motor 9. The electric motor 9 is received in a motor housing 90. The motor housing 90 of the electric motor 9 is connected to a housing part 130 of the electronic control unit 13 by means of a press connection.

Figure 4:
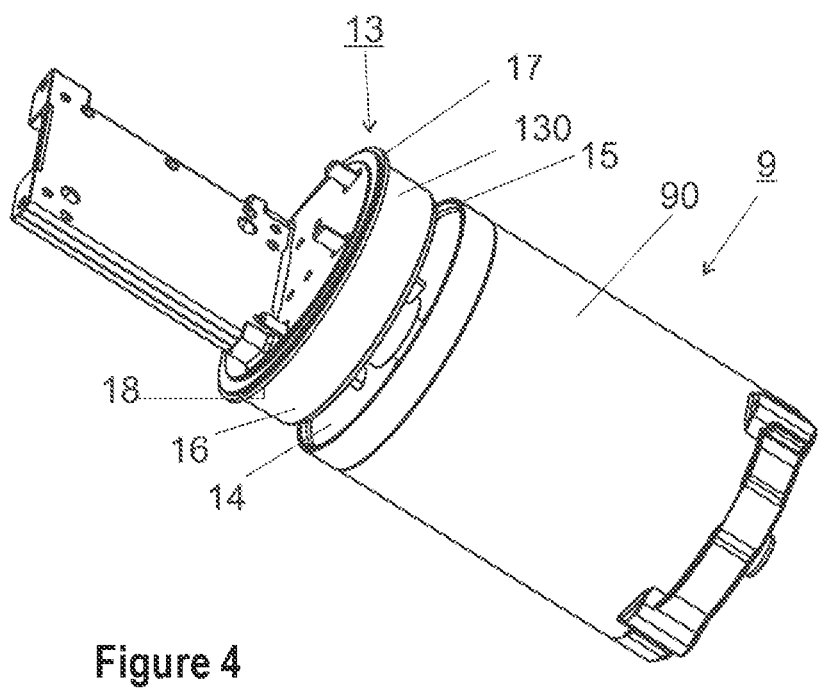
FIG. 4 is an exploded view of the housing of the electric motor of FIG. 3 with the electronic control unit.

As shown in FIG. 4 the motor housing 90 of the electric motor 9 has an opening 14 on a front face 15, the housing part 130 of the ECU 13 being pressed therein. The housing part 130 has a taper 16 with a peripheral seat surface 20 which is delimited by a peripheral shoulder 17 at the end remote from the motor. The shoulder 17 serves as a stop in the joining process. The shoulder 17 thus delimits the joining distance. In the pressed-in state the shoulder 17 bears with the lower face 18 against the front face 15 of the motor housing 90.

Figure 5:
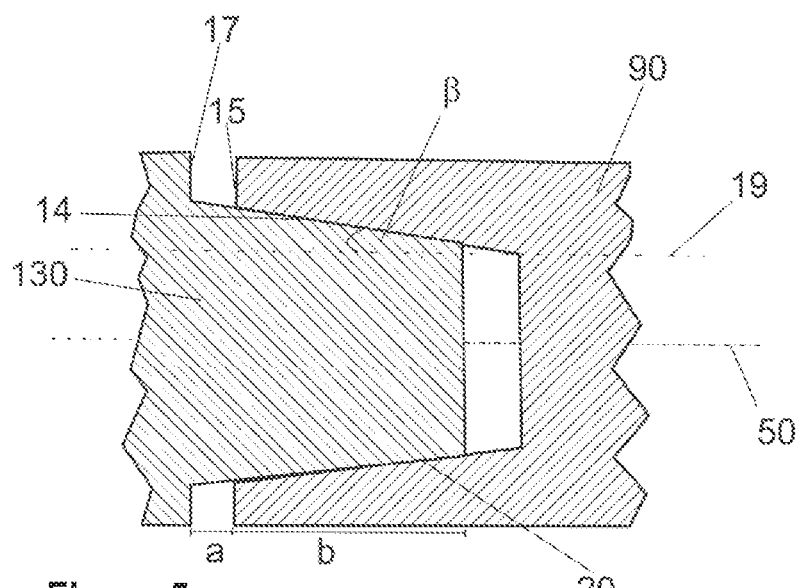
FIG. 5 is a schematic view of a joining process of a housing of an electric motor with a housing of a control unit.
Figure 6:
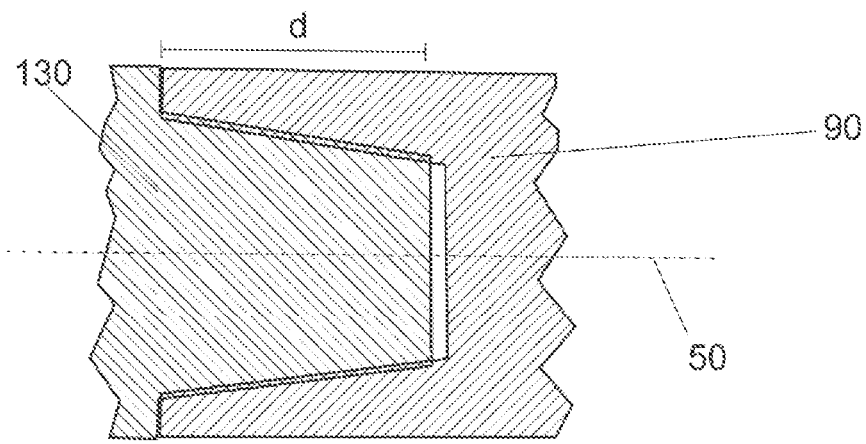
FIG. 6 is a schematic view of a joining process of a housing of an electric motor with a housing of a control unit.

FIGS. 5 and 6 show schematically a joining process between the motor housing 90 and the housing part 130 of the ECU 13. The motor housing 90 has in the upper front face 15 in the vicinity of the electronic control unit 13 the opening 14 into which the housing part 130 surrounding the electronic control unit may be inserted. The opening 14 is of tapered design and widens in the direction of the front face 15. In other words, the internal surface 19 is a tapered joining and active surface with a setting angle β (half cone angle). The housing part 130 of the electronic control unit has a corresponding tapered seat surface 20 for producing a tapered press connection. The annular shoulder 17, which serves as a stop during the joining process, adjoins the tapered seat surface 20. The tapered seat surface 20 tapers away from the shoulder 17. The setting angle β of the internal surface 19 and the tapered seat surface 20 in this case are identical apart from production-related differences, so that during the joining process a bearing of the two surfaces is produced over the entire surface.

As shown in FIG. 5, initially the joining process takes place without force until the tapered seat surface 20 bears over the entire surface against the inner face 19 of the opening 14. In this case, in the longitudinal direction 50 the housing of the ECU 130 has already been introduced into the motor housing 90, preferably by 90% of the joining distance, wherein the joining distance d describes the entire axial penetration depth of the ECU housing 130 into the motor housing 90. The joining of the two housing parts 130, 90 is carried out by an interference connection (see FIG. 6).

The oversize may be set by means of the push-on distance a, wherein the push-on distance a describes the last or final part of the axial joining distance d which the motor housing 90 located loosely on the ECU housing 130 has to cover in order to reach the position of the interference fit.

The axial relative displacement (pushing-on) of the parts 130, 90 to be joined, leads to transverse strains and thus to the creation of a corresponding jointing pressure in the active surfaces. As a result of the oversize, therefore, the motor housing 90 is widened in the region of the opening 14. Consequently, a surface pressure is generated in the friction surfaces.

The length of the joining distance without force b depends on the choice of setting angle β. The greater the angle β, the greater the joining distance without force b. However, with an increasing setting angle β the joining force also rises, whilst the releasing force drops. An optimal compromise is desired, with a releasing force which is as high as possible, a joining force which is as low as possible and a joining distance without force which is as great as possible.

The setting angle β preferably ranges from 0.5°-5°, in particular ranges from 1°-3° and is preferably approximately 1°. The joining distance without force b is additionally preferably greater than the push-on distance a so that the required joining force only rises at the end of the joining process. Preferably the joining distance without force b takes up more than 60% of the entire joining distance d, further preferably more than 70% of the entire joining distance d. Preferably the push-on distance a takes up more than 8% and less than 30% of the entire joining distance d. The advantage of this delayed rise in the joining force is that other joining processes with lower joining forces carried out in parallel may be reliably monitored. Thus, for example, electrical plug contacts may be inserted during the joining process and the plug-in process may be assessed using the prevailing plug-in forces.

Since the joining distance d is delimited by the shoulder 17 of the ECU housing 130, other dimensions which are dependent on the joining process may be constant, for example the insertion depth of electrical plug contacts.

However, it is not possible for the joining to take place until a desired joining force is reached, due to component tolerances. The press connection is thus less secure than in a nominal case. This reduction of the force due to the tolerances of the joining partners has to be taken into consideration in the design.

Figure 7:
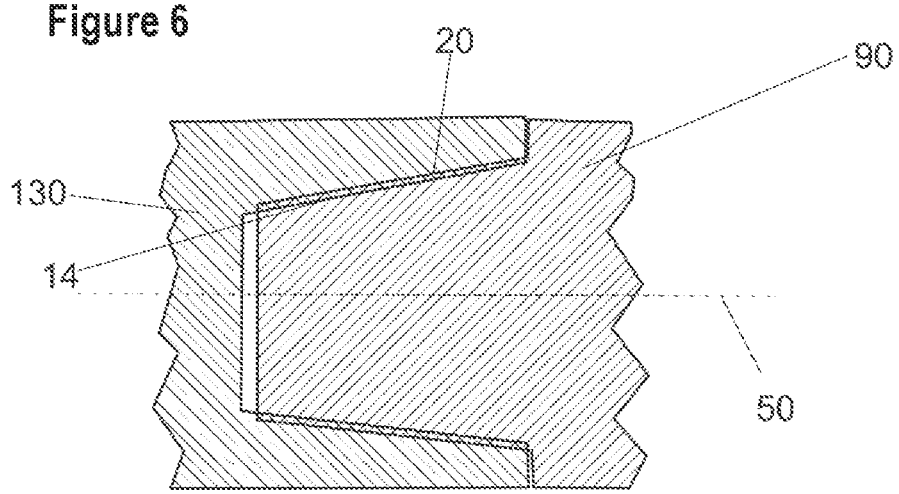
FIG. 7 is a schematic view of a tapered interference fit between a housing of an electric motor and a housing of a control unit.

FIG. 7 shows a second possible embodiment in which the ECU housing 130 has a tapered opening 14 and the motor housing 90 has a corresponding tapered seat surface 20.

In the embodiments, a limit to the joining distance may be dispensed with. The joining process is only terminated when a fixed joining force is reached, whereby a mechanical connection which may be reproduced very effectively may be achieved.

It is also possible, instead of the purely tapered connection, to use a combination of a cylindrical and tapered press connection in the axial direction. In this case, the internal surface of the opening has a cylindrical and a tapered partial region, wherein the cylindrical partial region extends inwardly starting from the front face and the tapered region adjoins thereto in the axial direction. Preferably, the cylindrical region is between 5% to 15%, wherein the remaining region is of tapered configuration. Correspondingly, the tapered seat surface to be inserted into the opening also has a cylindrical partial region and a tapered partial region, wherein the tapered partial region adjoins the cylindrical partial region at the end in the vicinity of the joining partners. This combined press connection has the advantage that the joining partners may be manufactured in a simpler manner and the manufacturing is able to be monitored in a simpler manner in terms of measuring technology. Additionally, an annular groove for receiving an O-ring, which improves the seal between the joining partners, may be incorporated in the cylindrical region. During the joining process, a joining distance without force is not present due to the cylindrical region. The force required for the joining rises abruptly at the end as soon as the push-on distance is reached, when the oversize comes into effect. The cylindrical region thus also constitutes a releasing force, whereby the connection becomes more secure. The joining distance is delimited by a stop of the two components to be joined together.

What is claimed is:

1. An electromechanical motor vehicle steering system, comprising:
    an electric motor,
    an electronic control unit, and
    housing parts at least partially surrounding the electromechanical motor vehicle steering system,
    wherein at least two of the housing parts are connected to one another by interference fit, wherein the interference fit is at least partly a tapered interference fit, and wherein an internal part of the housing parts connected by means of the interference fit has a peripheral shoulder which delimits the joining distance.

2. The electromechanical motor vehicle steering system of claim 1 wherein the tapered interference fit is formed by two corresponding tapered joining surfaces which form a setting angle.

3. The electromechanical motor vehicle steering system of claim 2 wherein the setting angle ranges from 0.5°-5°.

4. The electromechanical motor vehicle steering system of claim 1 wherein the interference fit has an oversize.

5. The electromechanical motor vehicle steering system of claim 1 wherein a motor housing surrounding the electric motor is connected to at least one of the housing parts surrounding the electronic control unit by means of the interference fit.

6. An electromechanical motor vehicle steering system, comprising:
    an electric motor,
    an electronic control unit, and
    housing parts at least partially surrounding the electromechanical motor vehicle steering system,
    wherein at least two of the housing parts are connected to one another by interference fit, wherein the interference fit is at least partly a tapered interference fit, and wherein in a longitudinal direction the interference fit is a combination of a cylindrical interference fit and a tapered interference fit, and wherein an annular groove with an inserted O-ring is provided in the region of the interference fit for sealing between the housing parts.

7. A method for connecting housing parts of an electromechanical motor vehicle steering system comprising an electric motor and an electronic control unit, comprising:
    providing an internal housing part and an external housing part, wherein the external housing part has an opening with an at least partially tapered internal surface, and wherein the internal housing part has a corresponding taper with a tapered seat surface, wherein the corresponding tapered surfaces form a setting angle; and
    positioning the external housing part on the internal housing part and pressing the external housing part onto the internal housing part with a defined axial joining force, and wherein the internal housing part has a peripheral shoulder which delimits a joining distance.

8. The method of claim 7 wherein the setting angle ranges from about 0.5°-5°.

9. The method of claim 7 wherein a fit of the internal housing part to the external housing part is an interference fit with an oversize.

10. The method of claim 9 wherein the interference fit is exclusively a tapered interference fit and the joining distance comprises a joining distance without force and a push-on distance, wherein the joining distance without force is greater than the push-on distance.

11. The method of claim 7 wherein the external housing part and the internal housing part is respectively a motor housing surrounding the electric motor and a housing part surrounding the electronic control unit.

* * * * *